Sept. 20, 1971 W. A. C. THEED 3,606,174
TIMER PULPING METHOD
Filed Nov. 30, 1967 3 Sheets-Sheet 1

Sept. 20, 1971  W. A. C. THEED  3,606,174
TIMER PULPING METHOD

Filed Nov. 30, 1967  3 Sheets-Sheet 3

INVENTOR
WILLIAM A.C. THEED
BY
Watson, Cole, Grindle & Watson
ATTORNEY

United States Patent Office 3,606,174
Patented Sept. 20, 1971

3,606,174
TIMBER PULPING METHOD
William A. C. Theed, Wargrave, England, assignor to International Pulp Holdings Limited
Filed Nov. 30, 1967, Ser. No. 686,881
Claims priority, application Great Britain, Dec. 9, 1966, 55,249/66
Int. Cl. B02c 21/02
U.S. Cl. 241—18                                     6 Claims

ABSTRACT OF THE DISCLOSURE

A method for pulping timber in the woodlands to save the cost of transporting felled timber to a pulping mill. Portable equipment can be transported to the site on a member of trailers or low loaders and these can produce dried pulp for delivery direct to the users. The great heat used in pulping the timber and in cooling the engine driving the pulper can be used for drying the pulp.

---

The present invention relates to an apparatus and method for pulping timber. In the planting of woodlands there is a great deal of small timber arising from thinnings in the newly planted forests which is difficult to dispose of profitably as the timber is too small for saw mills and the cost of transport is high. According to one aspect of the present invention pulping of timber is performed on site by use of a portable unit comprising an engine and a grinder, pulper, or other tool, driven by the engine. The expression "timber" includes other sources of cellulose such as bamboo.

The wood thinnings referred to will invariably be wet but a diesel or other engine generates considerable quantities of waste heat and waste heat will also be generated by the machining tool and the present invention contemplates using some or all of this waste heat to dry the wet pulp so that there is produced a useful commodity-dry wood-pulp which could be used, for example in the paper making industry, directly without having to be transported first to a pulp mill.

The equipment is convenient for use on site, that is in the forest, and according to a second aspect of the invention a portable unit comprises an engine and a grinder, pulper, or other wood machining tool.

The equipment requires a reasonably small capital outlay, and as it is capable of being moved from site to site and does not require mains electrical power but can be supplied with appropriate diesel or other fuel it brings into use small wood which would otherwise be wasted.

The equipment preferably includes one or more heat exchangers for heating air for drying the wet wood pulp. Thus a heat exchanger could use the engine cooling water or the water or other liquid for cooling the machining tool, and indeed ambient air for drying the pulp could be passed through two such heat exchangers one after the other. Use may also be made of heat in the exhaust gases from the engine which can be combined with the air passing to the pulp drier.

In one form of the invention the drying air is passed through a venturi and the exhaust gases from the engine are supplied at the throat of the venturi.

If necessary a fan driven by the engine can be arranged to provide forced flow of the drying air.

There may be one, two, or more engines and tools, or one engine could drive a number of tools; if there is more than one engine their exhausts can be combined at the drier.

According to a further aspect of the invention, gas from the bark and waste wood ground by a wood tool is used as fuel in an engine driving the tool.

The invention may be carried into practice in various ways one embodiment will now be described by way of example with reference to the accompanying drawings, of which:

Figure 1:
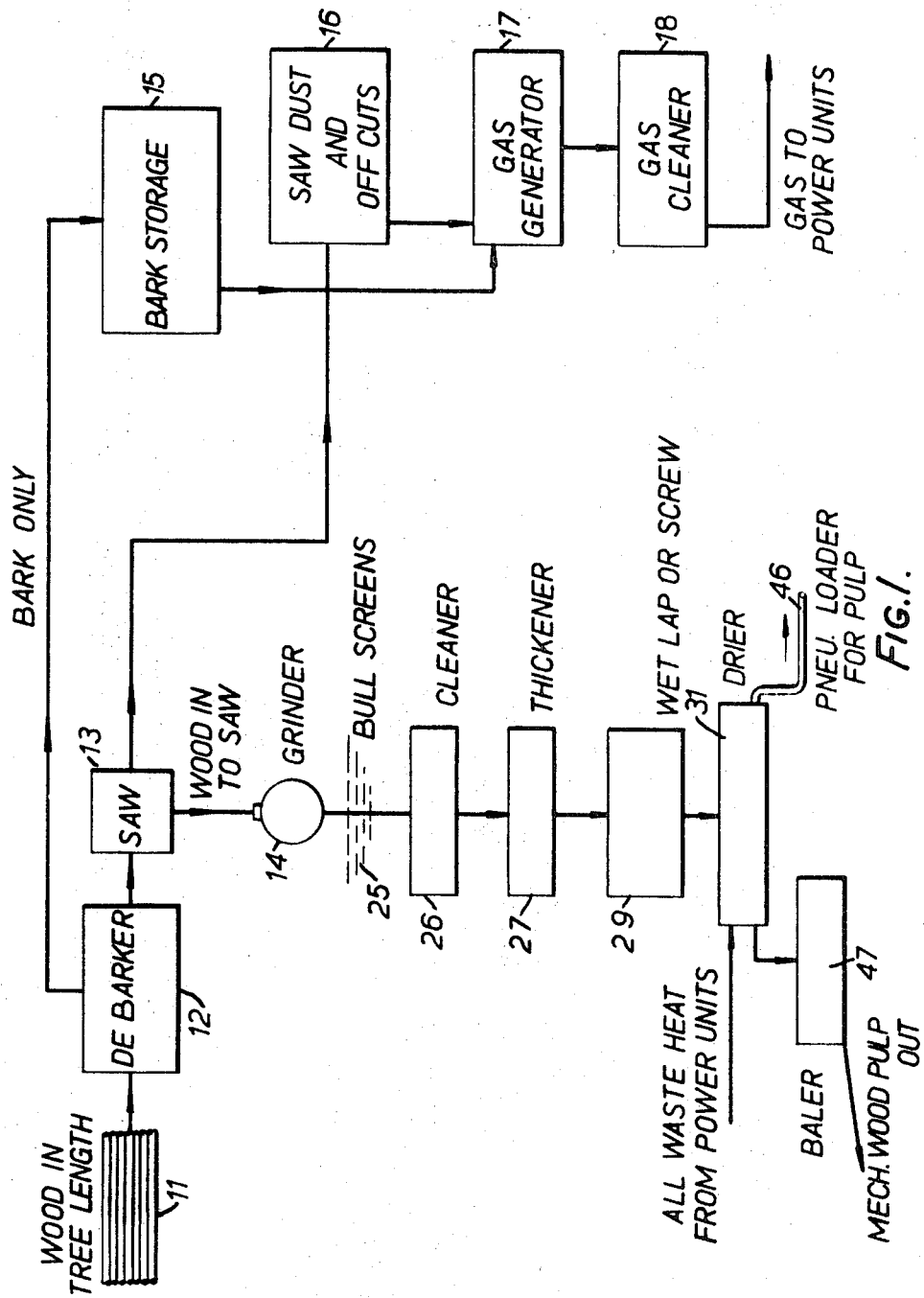
FIG. 1 is a flow chart showing the operation of the timber pulping equipment.

FIG. 1 shows how wood in tree length at 11 is fed first to a debarker 12 and then to a saw 13 for cutting it into a suitable size for pulling by a diesel-engine-driven grinder shown at 14. The debarker and saw are driven by the power take-off from a tractor, which can be used generally about the site, since the debarker and saw are only needed intermittently to provide sufficient timber for continuous operation of the grinder.

The bark is stored in a store 15 and off-cuts and saw dust from the saw 13 are stored at 16 and this material is used in a gas generator 17 for producing producer gas which after cleaning at 18 can be used to enrich the fuel driving the engines driving the grinder 14.

There are two grinders of the high speed pitless magazine type and each is driven by two diesel engines via a cogged belt to a common shaft. Each engine is between one hundred and two hundred horsepower. Each grinding wheel is overhung on the common shaft enabling wheel changes to be made quickly.

Figure 2:
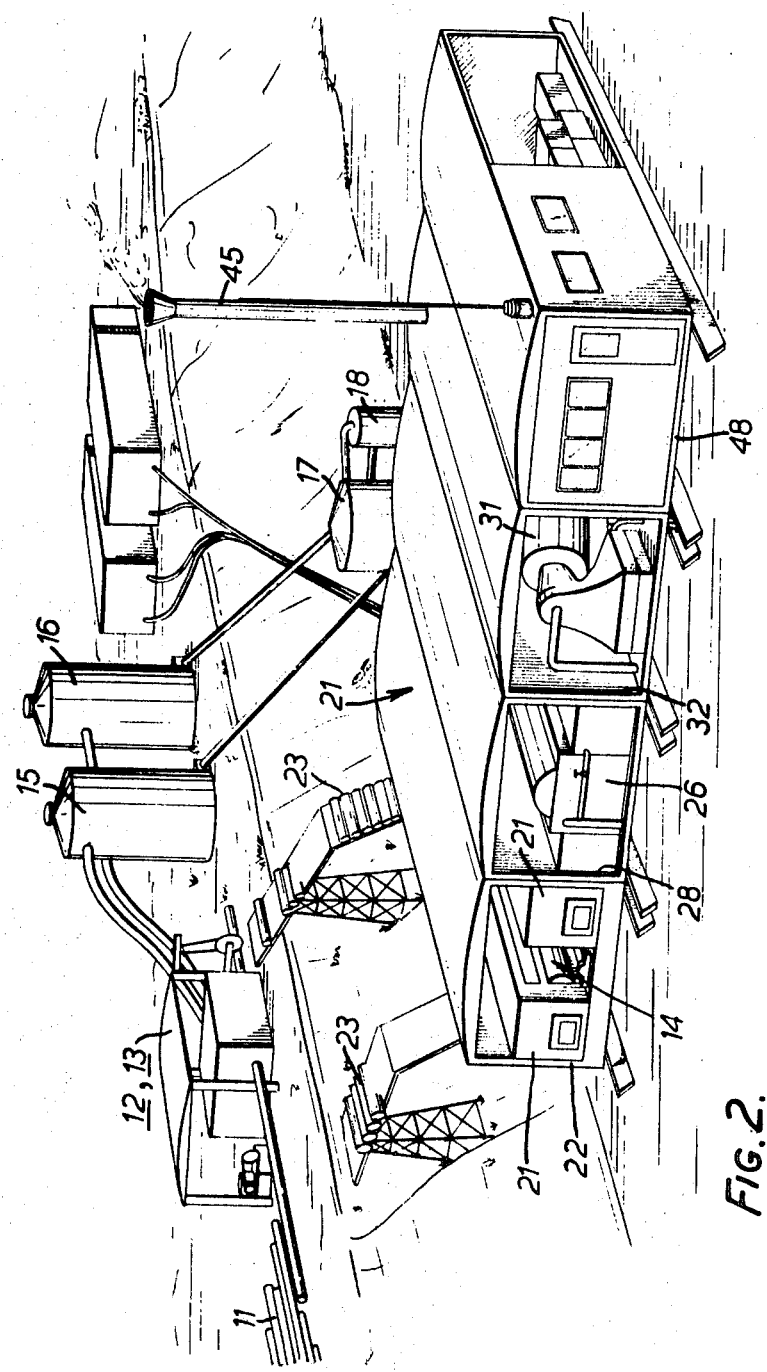
FIG. 2 is a diagrammatic sketch of a view of the site in a typical case.

In the arrangement being described a single rectangular frame unit supports four diesel engines 21, two positioned side-by-side at each end of the frame shown generally at 22 in FIG. 2. The sawn wood shown at 23 is fed into the frame 22 over the grinders which use white water or appropriate suds coolant in sufficient quantity to prevent fire.

The coolant is continually circulated and the ground pulp is passed through bull screens 25 to a cleaner 26 and a thickener 27 which are housed in the adjacent frame 28, and which serve respectively to remove large particles and excess water to leave about 40% fibres and, 60% water. This partly-dried pulp is fed by means of a screw or other conveyer 29 to a drier 31 which is housed in the next adjacent frame 32 where the pulp is dried down to about 90% fibres, which is sufficient for transmission to users.

Figure 3:
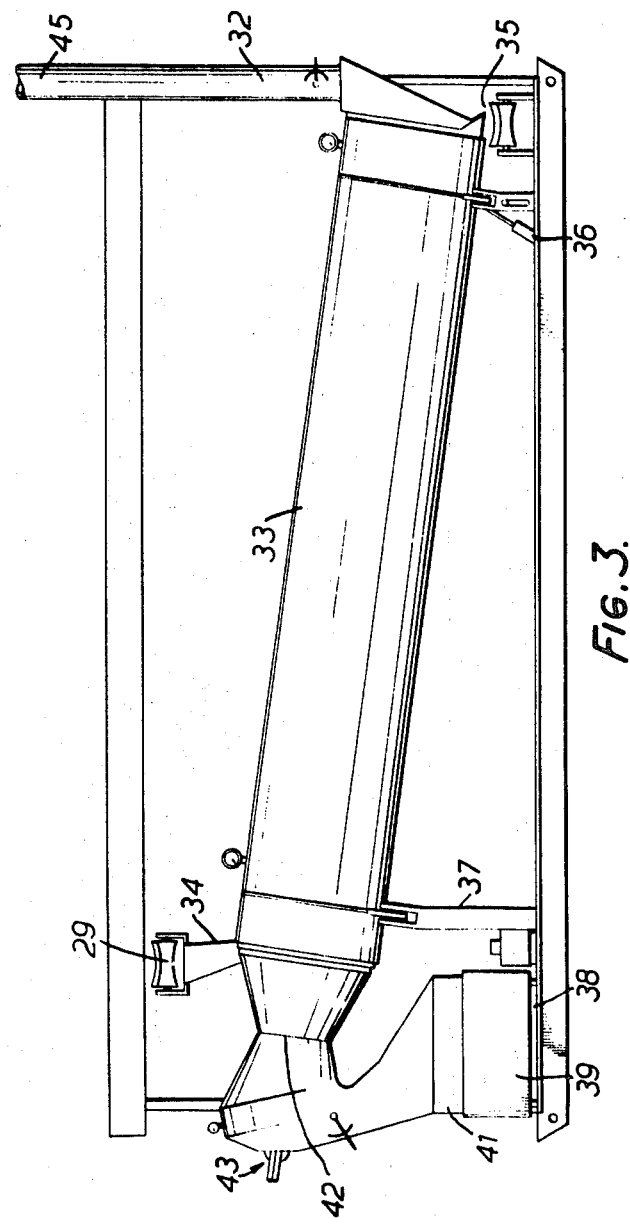
FIG. 3 is a diagrammatic elevation of the drier unit.

The drier is shown in FIG. 3 and consists of a drum 33 which its axis inclined a little from the horizontal so that the wet pulp is fed in by the screw 29 at the top at 34 and the dry pulp leaves at the bottom at 35. The angle of the drum can be adjusted by means shown generally at 36 and it can also be rotated during drying by conventional mechanism shown generally at 37.

Drying is effected by ambient air from 38 which is passed in turn through heat exchangers 39 and 41, one of which receives heat from the circulating coolant for the grinders and the other of which receives heat from the circulating cooling water for the diesel engines 21.

The air is drawn in by fan past the heat exchangers and through a venturi 42 to the inlet of the drying air passage through the drum 33 and it flows throughout the drum in heat-exchange relation with the wet pulp. The exhausts from all the diesel engines 21 are led to the throat 42 of the venturi and are injected into the drying air stream as shown generally at 43. In this way the considerable waste heat derived from the grinder, from the diesel engine cooling system, and from the diesel engine exhaust, is used to dry the wet pulp and produced a commodity ready for the users. The exhaust products from the drier are fed to a chimney 45.

Figure 4:
FIG. 4 is a diagram showing how one of the frame units carrying the various pieces of equipment can be transported by low loader.

The dried pulp can be loaded pneumatically as indicated generally at 46 in FIG. 1 or can be baled and loaded mechanically as shown generally at 47 in FIG. 1. A frame 48 includes an office and a canteen and auxiliary engines for baling power and so on and it will be seen that the four frames 22, 28, 32 and 48 are transportable and can be removed from site to site as the timber is used up using a low loader as indicated generally in FIG. 4. Water and diesel oil tanks can be similarly removed.

The other equipment on the site consisting of the de-barker, saw, bark store, and sawdust and off-cut store, can be removed on a trailer.

Thus when the timber at a site has been exhausted the equipment is completely portable for removal to another site. It will be noted that no main electricity supply is necessary and that it is only necessary to provide diesel oil for the fuel storage tank and to top up the circulating water systems from time to time and this means that it is a simple matter to perform the pulping of the small timber where it is available so that the timber does not have to be transported to a mill, an operation which is likely to be uneconomic so that the small timber would otherwise be wasted. In a similar manner the difficulties of transporting large timber are overcome by pulping the timber on the site. It might be that the equipment would be at one site for many months before removal to another.

The initial capital cost of the equipment is low and special factory space does not have to be provided.

It is expected that the amount of diesel oil required will be low since once the engines have been started by pilot ignition it is likely to be possible to use enriched fuel consisting of perhaps 20% diesel oil and 80% producer gas from the generator 17. This gas could also be used for driving a gas turbine either for driving the grinder as an alternative to the diesel engines or for driving auxiliary equipment.

Typical frames 22, 28, 32 and 48 would be about 20 feet long, 8 feet wide, and 8 feet high.

What I claim as my invention and desire to secure by Letters Patent is:

1. A method of preparing pulped timber, comprising the steps of; transporting an engine, a pulping tool, a debarker, a saw, a drier, and a heat-exchanger to a site where the timber has been growing, de-barking felled timber with the de-barker, sawing the de-barked timber with the saw, pulping the sawn timber with the pulping tool driven by the engine, drying the pulped timber in the drier, supplying heat for the drier from the heat-exchanger, and supplying heat generated by the action of the engine driving the pulping tool to the heat-exchanger.

2. A method as claimed in claim 1 further comprising the step of supplying heat from a coolant fluid used by the engine to the heat-exchanger.

3. A method as claimed in claim 1 wherein the last step of supplying heat includes supplying heat from exhaust gases from the engine to the heat-exchanger.

4. A method as claimed in claim 1 further comprising the step of supplying a fuel gas generated from waste wood on the site to the engine.

5. Plant for preparing pulped timber including a debarker, a saw, a pulping tool, an engine for driving the pulping tool, a heat-exchanger and a drier, means for feeding de-barked and sawn timber from the de-barker and saw to the pulping tool, and means for feeding pulped timber from the pulping tool to the drier, the heat-exchanger being connected to receive heat from the engine and pulping tool and to deliver heat to the drier.

6. Plant as claimed in claim 5 including a gas generator for generating gas from waste wood, and means for supplying generated gas to the engine as fuel.

References Cited
UNITED STATES PATENTS

| | | | |
|---|---|---|---|
| 844,627 | 2/1907 | Sylvester | 34—86X |
| 1,658,775 | 2/1928 | Campbell | 130—27 |
| 1,850,733 | 3/1932 | Talbot | 241—18 |
| 2,777,212 | 1/1957 | McOmber | 34—86 |
| 3,055,598 | 9/1962 | Ginaven | 241—65X |

DONALD G. KELLY, Primary Examiner

U.S. Cl. X.R.

241—25, 28